Oct. 26, 1948.  R. P. GARRISON ET AL  2,452,046
BEARING TEMPERATURE CONTROL SYSTEM
Filed Dec. 15, 1941  2 Sheets-Sheet 1
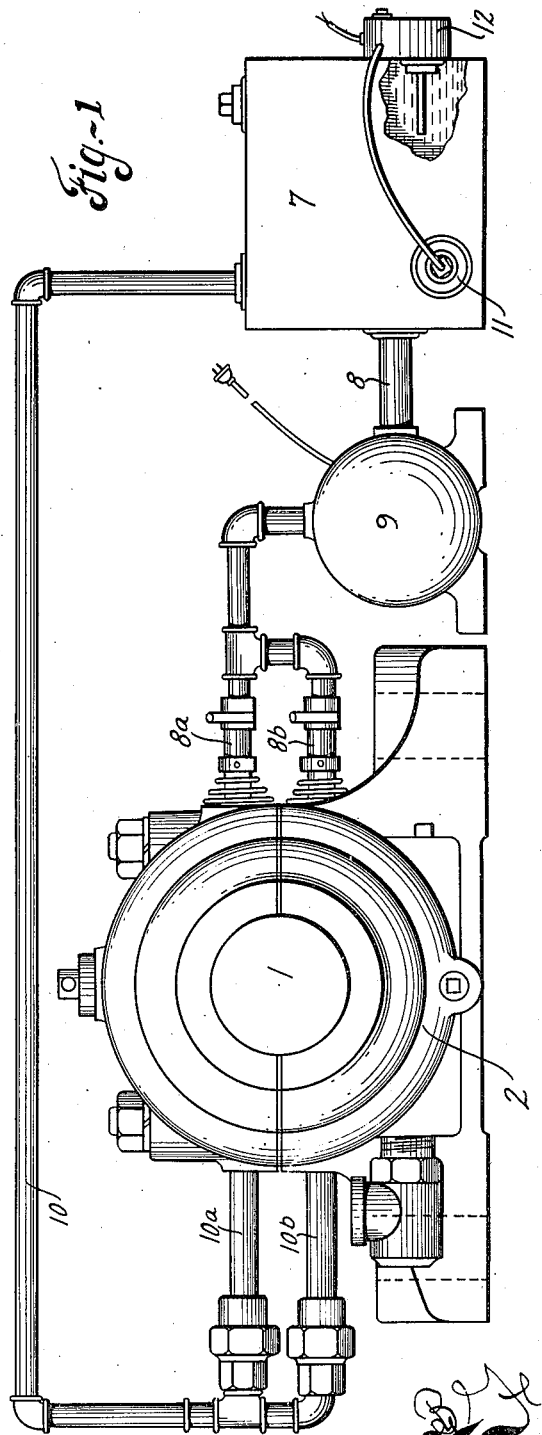
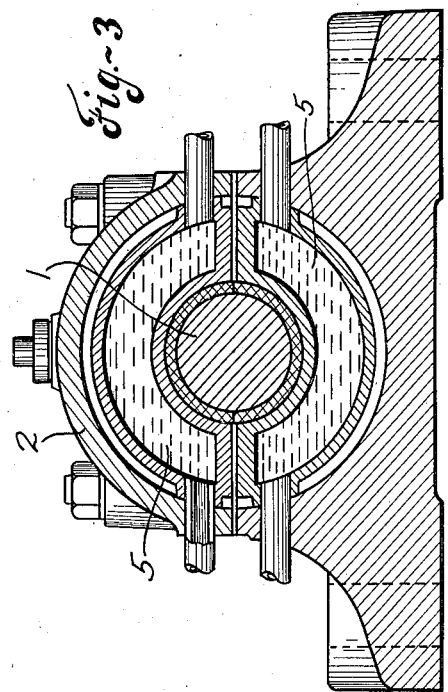
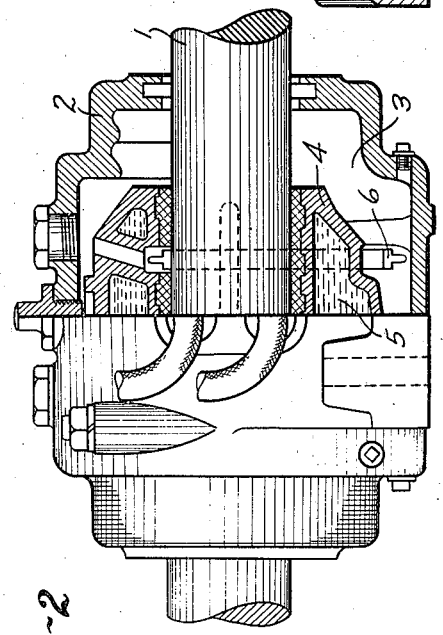

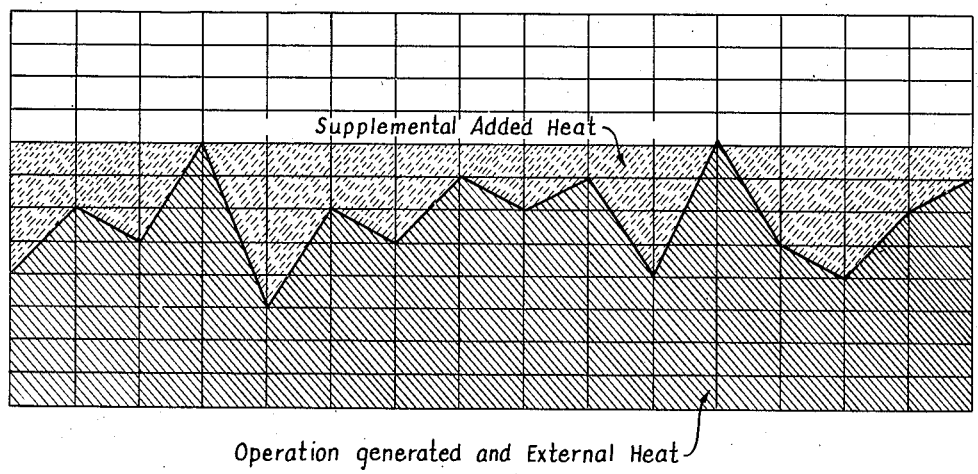

Patented Oct. 26, 1948

2,452,046

UNITED STATES PATENT OFFICE 2,452,046

BEARING TEMPERATURE CONTROL SYSTEM

Ralph P. Garrison and John R. Garrison, Dayton, Ohio, assignors to Garrison Machine Works, Inc., Dayton, Ohio, a corporation of Ohio Application December 15, 1941, Serial No. 423,066

6 Claims. (Cl. 308—77)

This invention pertains to heat exchange apparatus, and more particularly to a constant temperature control system wherein a fluctuating thermal supply is automatically compensated by an inversely proportioned thermal supply from a separate source to conjointly maintain a substantially uniform temperature level.

The present system is especially applicable to precision instruments and machines, for preventing distortion and warping with consequent inaccuracies of results incident to unequal temperature distribution.

For illustrative purpose, the invention is herein shown applied in a simplified form to a shaft bearing, but it is to be understood that it is not limited thereto, but is capable of a wide variety of embodiments in association with sundry instruments and apparatus.

Much inaccuracy of machine operations, line shafting and the like, is due to unequal expansion and contraction, resulting from operation generated heat. Such variation may be compensated by circulating a cooling medium relative to the bearing whereby the operation generated heat is dissipated. However, in such lowered temperature control it is highly desirable that the temperature of the cooling medium be regulated and varied proportionately to the fluctuations of heat generated by operation.

However, it is found that the preferable way of compensating for such generated heat fluctuations and maintenance of a uniform temperature is by adding additional heat thereto in varying degree proportioned inversely to the fluctuating degree of generated heat. By so doing, a uniform predetermined temperature level may be maintained somewhat above the maximum degree of operation generated heat. It has been found possible to minimize expansion and contraction and resulting distortion and misalignment of machine parts by maintaining such higher temperature level more easily and efficiently than by maintaining a lower temperature level by subjecting the operating parts to cooling influence.

The herein described method is applicable to either mode of operation, by merely interchanging a cooling element for a heater element, or vice versa.

The object of the invention is to provide a system of thermal conditioning for a bearing which is subjected to generated heat influence of relatively moving parts, to minimize expansion and contraction and prevent distortion and misalignment, which may not only be economically installed, but will be highly efficient in use, automatic in operation, uniform in its result, having relatively few parts, and be unlikely to get out of repair.

A further object of the invention is to provide an automatic thermal control system for bearings or the like, which is adaptable to maintenance of uniform conditions by adding supplemental heat, and raising the ultimate temperature level, or by dissipating the operation generated heat and maintaining the temperature at a lower predetermined level.

A further object of the invention is to provide an automatic thermal conditioning system embodying the advantageous structural features and inherent meritorious characteristics and mode of operation herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is illustrated a simplified form of the preferred but not necessarily the only form of embodiment of the invention, Fig. 1 is a schematic view illustrating the thermal control system in a more or less extended form. It will be understood that in practical application the embodiment may be condensed or, incorporated directly in a unitary structure.

Fig. 2 is a longitudinal sectional view of a shaft bearing to which the invention is applied.

Fig. 3 is a transverse sectional view thereof.

Fig. 4 is a graph illustrative of the addition of supplemental heat inversely to the fluctuating degree of operation generated heat.

Like parts are indicated by similar characters of reference throughout the several views.

In the present instance, it is contemplated that the subject bearing is manufactured and assembled under definite thermal conditions, whereby the shaft will run free but true, in accurate axial alignment. Subsequent operation under different temperature conditions may induce expansion whereby the shaft will become slightly loose in its bearing and may wobble or become out of alignment. To the contrary, the use of the bearing under lowered temperature conditions may cause contraction, whereby the shaft will run tight in the bearing or the bearing may "grab," increasing resistance to operation and increasing friction whereby operation generated heat is increased.

The primary purpose of the invention is to enable the fluctuations of operation generated heat, or the "peaks and valleys" thereof to be leveled. The leveling may be effected by in effect filling the "valleys" to the level of the "peaks" or above, and maintaining such temperature level, as indicated in Fig. 4.

Conversely, the leveling effect may be accomplished by dissipating the operation generated heat and thus removing the "peaks" to the level of the "valleys."

An alternative method is to alternately supply additional heat, so as in effect to partially fill the valleys and partially dissipate the generated heat to establish a temperature level intermediate the high and low temperature levels of Fig. 4.

It is found that the first mentioned method, consisting of adding supplemental heat to maintain a higher temperature level equal to or above that of the maximum "peaks" is preferable, as it is more easily maintained constant.

In the drawings is illustrated a thermally conditioned shaft bearing which may comprise a part of any mechanism. The rotation of a shaft in a journal bearing generates heat, and the bearing becomes warm regardless of the efficiency of the lubrication or incorporated anti-friction features. To attempt to dissipate the generated heat by cooling the bearing, either externally or by air conditioning the surrounding atmosphere, or by circulation of cooling medium, merely causes the bearing to contract, which increases the tendency of the bearing to frictionally resist the rotation of the shaft with a resulting further increase of heat generation. Paradoxically, the more the bearing is cooled, which thereby causes it to shrink more closely to the shaft, the greater will be the heat generation, which necessitates further cooling effect in a never ending cycle.

When a machine is subjected to cooling influence or to alternating cooling and heating influences by which heat generation and external atmospheric cooling are sought to be compensated, and a lowered maximum temperature level is sought to be maintained, the machine generates heat in specific areas about bearings or at other points of operation to a degree higher than the predetermined temperature, faster than such heat can be dissipated. It requires an appreciable period of time for the warmer and cooler sections of a machine to equalize in temperature. In no case can the heat be dissipated as rapidly as it is generated. Consequently, while a considerable portion of the machine may be maintained at an established lower temperature, increased heat zones will develop adjacent to working points or heat generating areas.

Under such condition, wherein a portion of the machine is being cooled to a selected temperature level and another part is being warmed above the selected temperature by machine generated heat, definite different temperature zones are developed and strains and stresses are set up with consequent warping of the structure. Such a system of cooling or alternate cooling and heating to maintain a given temperature is predicated upon an erroneous idea that the machine generated heat may be absorbed or dissipated as rapidly as it develops. Such is not the case. The maintenance of part of the machine cool while localized heat zones are developed about bearings and adjacent working points only aggravates the initial condition sought to be overcome. However, by maintaining the machine at a temperature level in excess of the machine generated heat by supplying supplemental heating influence in varying degree inversely to that generated by the machine operation, such unbalanced or unequal temperature distribution and resulting warping and distortion of the machine structure cannot occur.

Referring to Figs. 1, 2 and 3, wherein the structural features are illustrated in a simplified form, a rotary shaft 1 is journaled in a bearing, of which 2 is the bearing box or housing which is recessed to form a lubricant reservoir 3. Within the bearing box or housing 2 and comprising an integral part thereof, is the bearing sleeve 4. The bearing sleeve is recessed or jacketed to form a chamber 5 for circulation of heat transfer medium. The chamber 5 for heat transfer medium surrounds the shaft and its bearing area within the bearing sleeve. A lubricant slinger ring 6 is shown by which lubricant is elevated from the reservoir 3 to the bearing surface of the shaft within the bearing sleeve.

In the present instance the bearing is longitudinally split, so that there are in effect two semi-circular chambers 5, one in each bearing section, instead of one complete annular chamber. However, the function and result are the same.

The division of the bearing into such separable halves necessitates circulatory connections for the heat exchange medium to each of the bearing sections. Heat exchange medium is supplied to the respective bearing sections from any suitable supply reservoir 7, which may be variously located, either as an integral part of the machine structure or entirely outside and removed therefrom. Each bearing section is connected with the reservoir 7 through a discharge or outlet conduit 8, which preferably, but not necessarily, includes a motor driven pump or impeller 9.

If desired, the reservoir may be arranged for gravity feed or for convection circulation of the heat exchange medium relative to the bearing. Beyond the pump 9 the supply conduit is bifurcated at 8a and 8b for connection to the separable bearing sections, each of which includes a chamber 5. At the opposite side of the bearing the respective bearing section chambers are connected through branch conduits 10a and 10b with the return conduit 10, through which the circulating heat exchange medium is returned to the reservoir.

At some place in the system there are interposed a thermal conditioning element 11 for changing the temperature of the circulating heat exchange medium, and a thermostatic regulator subject to the influence of fluctuating temperature of the heat exchange medium and governing the thermal conditioning element in accordance therewith.

In the drawings both the conditioning element 11 and the thermostatic regulator 12 are shown in communication with the contents of the supply reservoir 7. It is to be understood, however, that either or both these members may be located in the circulation chamber 5 within the bearing unit, or elsewhere in the circulatory system. The circulating heat exchange medium is subjected to the influence of the operation generated heat developed within the bearing, and in addition thereto is subjected to the influence of the thermal conditioning member 11. The latter is shown as electrically energized, but may be of other style. In the event that the thermal conditioning member is an electrical heater, as the temperature of the circulating medium raises due to machine generated heat, the thermostatic regulator minimizes the heating effect of the thermal conditioning member 11. To the contrary, as the operation generated heat decreases the thermostatic regulator operates to increase the heat supplied by the heater 11. Thus, the temperature level is maintained substantially uniform at a predetermined level above the maximum temperature resulting from the machine operation. As the operation generated heat increases the temperature of the circulating heat exchange medium, the latter influences the thermostatic regulator 12 to minimize the heating influence of the heater 11. When, however, the temperature of the circulating heat exchange medium is decreased, incident to decrease or lack of operation generated heat, the thermostatic regulator 12 is influenced thereby to energize the heater 11 to supply sufficient heat to compensate for the failure of the generated heat to maintain the predetermined temperature of the heat exchange medium and the temperature of the machine structure which is subject thereto. It is found much more efficient to add a varying degree of supplemental heat inversely to the operation generated heat to maintain an even thermal condition than to oppose the generation of heat by subjecting the affected parts to cooling influence. However, to meet certain special conditions of use, the thermal conditioning element may comprise a cooling unit, adapted to variably offset or compensate for operation generated temperature rise, for which the present construction is equally well adapted. Likewise, the heating unit 11 may operate to offset or compensate for fluctuating influence of a cooling unit elsewhere in the system.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A split shaft bearing comprising two separable bearing sections, a shaft revoluble therein, and means for compensating for fluctuations of operation generated heat and minimizing resulting expansion and contraction, including separate chambers formed in the respective bearing sections in susbtantially concentric relation with the shaft to receive heating medium, a supply reservoir for heating medium common to the chambers of the respective bearing sections, a supply conduit connecting the supply reservoir with the said bearing section chambers, a return conduit connecting the respective bearing section chambers with the supply reservoir, a pump for circulating heating medium through a circuitous path including the conduits, chambers and reservoir, a heater to the influence of which the circulating heating medium is subjected, and a thermostatic regulator for the heater subjected to the influence of the circulating heating medium.

2. A shaft bearing, a revoluble shaft therein, the rotation of which tends to generate heat, and means for automatically compensating for fluctuations of temperature influence and consequent variations of expansion and contraction of the parts, including a chamber in said bearing substantially concentric with said shaft to receive heat exchange medium, by which operation generated heat is absorbed, a supply reservoir for heat exchange medium interconnected with said bearing chamber for circuitous flow of heat exchange medium therethrough, an impeller for inducing circulation of said heat exchange medium from the reservoir to the bearing chamber and return, a heater to the influence of which the heat exchange medium is subjected, and a thermostatic regulator for the heater subjected to the influence of the heat exchange medium, the construction and arrangement being such that said heater supplies heat to the heat exchange medium additional to the operation generated heat proportioned inversely thereto.

3. A split bearing for a revoluble shaft comprising plural hollow arcuate segments, wherein operation generated heat is developed by rotation of the shaft, and means for automatically compensating for fluctuations of temperature influence and consequent variations of expansion and contraction of the parts, including a circulatory system for heat exchange medium, including the hollow bearing segments through which heat exchange medium is circulated for absorption of the operation generated heat, a heater for supplying heat to the heat exchange medium independently of the operation generated heat, and a thermostatic regulator for the heater subject to the influence of the circulating heat exchange medium, the construction and arrangement being such that a fluctuating supplemental degree of heat is supplied to the heat exchange medium inversely to the degree of operation generated heat sufficiently to maintain a substantially uniform temperature condition equal to or greater than the maximum degree of operation generated heat.

4. A hollow shaft bearing, wherein localized heat is generated by operation of a shaft in said bearing, and means for automatically compensating for fluctuations of temperature influence and resulting expansion and contraction of the parts, including a chamber in said bearing for a heating medium by which at least a portion of the operation generated heat is absorbed, a heater member to the influence of which the heating medium is subjected, and a thermostatic regulator for the heater member subject to the influence of the heating medium, the construction and operation being such that the fluctuations of operation generated temperature are compensated by the action of the heater member to maintain a substantially equalized temperature level within the bearing.

5. A hollow shaft bearing, wherein localized heat is generated by operation of a shaft in said bearing, and means for compensating for varying thermal conditions and minimizing expansion and contraction of the parts, including a chamber in said bearing for a heating medium by which at least a portion of the operation generated heat is absorbed, an impeller for circulating the heating medium within said chamber, and heater means subjecting the heating medium to temperature change inversely to the absorption of operation generated heat thereby, and automatic governing means therefor.

6. A hollow shaft bearing, wherein localized heat is generated by operation of a shaft in said bearing, and means for compensating for varying thermal conditions and minimizing expansion and contraction of the parts, including a chamber in said bearing for heat exchange medium by which at least a portion of the operation generated heat is absorbed, an impeller for circulating heat exchange medium within said chamber, a heater for increasing the temperature of the heat exchange medium to a degree inversely of the degree of operation generated heat absorbed thereby, and automatic regulatory means for said heater, the construction and arrangement being such that the conjoint effect of the absorbed operation generated heat and heater supplied heat will maintain the temperature of the heat exchange medium at a substantially uniform level equal to or above the maximum degree of operation generated heat.

RALPH P. GARRISON.
JOHN R. GARRISON.

REFERENCES CITED

The following references are of record in the file of this patent:

UNITED STATES PATENTS

| Number | Name | Date |
|---|---|---|
| 802,453 | Johnson | Oct. 24, 1905 |
| 1,107,830 | Ogden | Aug. 18, 1914 |
| 1,323,551 | Rice | Dec. 2, 1919 |
| 1,404,538 | Mitchell | Jan. 24, 1922 |
| 1,409,736 | Lea | Mar. 14, 1922 |
| 1,754,080 | Briggs | Apr. 8, 1930 |
| 1,825,627 | Bowen | Sept. 29, 1931 |
| 1,989,585 | Bigelow | Jan. 29, 1935 |
| 2,009,823 | Van Vulpen | July 30, 1935 |
| 2,045,790 | Mioyette | June 30, 1936 |
| 2,184,908 | Chan | Dec. 26, 1939 |
| 2,271,637 | Garrison | Feb. 3, 1942 |

FOREIGN PATENTS

| Number | Country | Date |
|---|---|---|
| 24,167 | Great Britain | Dec. 12, 1894 |
| 122,042 | Great Britain | 1918 |